US006605311B2

(12) United States Patent
Villagran et al.

(10) Patent No.: US 6,605,311 B2
(45) Date of Patent: Aug. 12, 2003

(54) INSOLUBLE PROTEIN PARTICLES

(75) Inventors: Francisco Valentino Villagran, Mason, OH (US); Glenn James Dria, Okeana, OH (US); Herbert Thomas Young, Cincinnati, OH (US); John Michael Baughman, Cincinnati, OH (US); Jing Chen, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 241 days.

(21) Appl. No.: 09/885,693

(22) Filed: Jun. 20, 2001

(65) Prior Publication Data

US 2002/0039617 A1 Apr. 4, 2002

Related U.S. Application Data

(60) Provisional application No. 60/213,353, filed on Jun. 22, 2000.

(51) Int. Cl.$^7$ .................................................. A23J 1/00
(52) U.S. Cl. ........................................ 426/656; 426/590
(58) Field of Search ................................ 426/656, 590; 530/370–379, 360–378, 354–356, 418–427

(56) References Cited

U.S. PATENT DOCUMENTS

| | | | |
|---|---|---|---|
| 4,734,287 A | | 3/1988 | Singer et al. |
| 4,855,156 A | * | 8/1989 | Singer et al. ................ 426/565 |
| 4,961,953 A | * | 10/1990 | Singer et al. ................ 426/656 |
| 4,985,270 A | * | 1/1991 | Singer et al. ................ 426/565 |
| 5,021,248 A | * | 6/1991 | Stark et al. ..................... 426/96 |
| 5,069,936 A | * | 12/1991 | Yen ....................... 427/213.33 |
| 5,080,921 A | * | 1/1992 | Reimer ........................ 426/564 |
| 5,096,730 A | | 3/1992 | Singer et al. |
| 5,096,731 A | | 3/1992 | Singer et al. |
| 5,098,728 A | | 3/1992 | Singer et al. |
| 5,102,681 A | | 4/1992 | Singer et al. |
| 5,104,674 A | | 4/1992 | Chen et al. |
| 5,145,702 A | * | 9/1992 | Stark et al. ................... 426/531 |
| 5,153,020 A | * | 10/1992 | Singer et al. ................ 426/567 |
| 5,171,603 A | | 12/1992 | Singer et al. |
| 5,308,620 A | * | 5/1994 | Yen ............................. 424/484 |
| 5,330,778 A | | 7/1994 | Stark et al. |
| 5,350,590 A | * | 9/1994 | McCarthy et al. .......... 426/549 |
| 5,393,550 A | | 2/1995 | Tarr et al. |
| 5,494,696 A | * | 2/1996 | Holst et al. .................. 426/583 |
| 5,536,514 A | * | 7/1996 | Bishay et al. ................ 426/103 |
| 5,882,705 A | | 3/1999 | Sato et al. |
| 5,989,600 A | | 11/1999 | Nielsen et al. |
| 5,993,888 A | | 11/1999 | Gibson et al. |
| 6,168,819 B1 | * | 1/2001 | Zeller et al. ................. 426/569 |

FOREIGN PATENT DOCUMENTS

| | | | |
|---|---|---|---|
| EP | 0352144 | * | 1/1990 |
| EP | 0400714 | * | 5/1990 |
| WO | WO 89/05587 | * | 6/1989 |
| WO | WO 93/07761 | * | 4/1993 |

OTHER PUBLICATIONS

Sanchez, C., et al. —Thermal Aggregation of Whey Protein Isolate Containing Microparticulated or Hydrolyzed Whey Proteins; Journal of Agric. Food Chem., vol. 45, No. 7 (1997), pp. 2384–2392.

Renard, D., et al.—Rheological Properties of Mixed Gels Made of Microparticulated Whey Proteins and .beta.–lactoglobulin; Colloids Surf., vol. 12, No. 3–6 (1999), pp. 113–121.

Cheftel, J. Claude, et al.—Microcoagulation of Proteins for Development of "Creaminess"; Food Reviews International, 9(4), (1993), pp. 473–502.

Damodaran, Srinivasan, et al.—Food Proteins and Their Applications; Food Science and Technology, (1997), Marcel Dekker, Inc., New York, pp. 1–24, 25–57, 225–256, 393–423 & 473–502.

* cited by examiner

*Primary Examiner*—Carolyn Paden
(74) *Attorney, Agent, or Firm*—Erich D. Hemm; S. Robert Chuey; Carl J. Roof

(57) ABSTRACT

Insoluble, denatured, heat-stable protein particles are used in food and beverage products. The particles are easily dispersible in aqueous solutions and take the form of substantially non-aggregated macro-colloids. In a hydrated state the preferred mean diameter particle size distribution of the insoluble, denatured, heat-stable particles ranges from about 0.1 microns to about 3.0 microns, with less than about 5 percent of the total number of particles exceeding about 3.0 microns in diameter. The majority of the particles are substantially spheroidal in shape and have a substantially smooth, emulsion-like organoleptic character similar to that of high-calorie fats and oils. Additionally, these particles have a degree of protein insolubility of at least about 80%, which provides processing advantages during heat treatment.

40 Claims, No Drawings

INSOLUBLE PROTEIN PARTICLES

This application claims the benefit of Provisional Application No. 60/213,353, filed Jun. 22, 2000.

FIELD OF THE INVENTION

The present invention relates to insoluble, denatured, heat-stable protein particles and their use in food and beverage products. In particular, the present invention relates to a process for making insoluble, denatured, heat-stable proteins derived from both undenatured protein and partially denatured protein sources.

BACKGROUND OF THE INVENTION

The present invention relates to supplements and replacements for fats and oils in food and beverage products. In particular, the present invention relates to supplements and replacements for fats and oils that are capable of withstanding exposure to conventional treatments for food and beverage products that reduce biological activity and/or promote microbial stability. These processes are hereinafter referred to as "sterilization treatments." Additionally, the present invention relates to supplements and replacements for fats and oils that have similar smoothness and other organoleptic properties to the fats and oils they are intended to supplement and replace.

Foods rich in high-calorie fats and oils enjoy considerable popularity and make up a significant proportion of the diets of many people. However, food and beverage products made exclusively from these high-calorie fats and oils may be undesirable from a nutritional viewpoint. These foodstuffs also present many challenges in ensuring consistent product quality. Most notably, ensuring fat stability against oxidative reactions, preventing the development of off-flavors, and the potential instability of fat-water emulsions. Considerable effort, therefore, has been expended in an attempt to address the nutritional and processing deficiencies of these high-calorie food and beverage products.

One such approach has been simply to reduce the amount of high-calorie fats and oils used in food and beverage products. However, this approach has significant disadvantages. While reducing the level of high-calorie fats and oils may be beneficial from a nutritional standpoint, their simple reduction is subject to consumer acceptance limitations. High-calorie fats and oils contribute both to a product's taste and texture. Often, the amount of fat or oil removed to achieve a significant nutritional benefit adversely impacts the product's overall flavor and texture perception. In particular, reduced fat and oil products tend to lack the creamy mouthfeel, richness impression and flavor impact desired by consumers.

An alternative approach to the simple reduction in the level of high-calorie fats and oils has been their replacement with suitable, low-calorie compositions. To be widely acceptable, however, any replacement for such high-calorie fats and oils must closely approximate the organoleptic characteristics of the oil or fat to be replaced, of which mouthfeel is recognized as being among the most important.

Yet another approach to creating nutritionally beneficial foodstuffs has been the fortification of conventional food and beverage products with nutritionally beneficial components. However, if the conventional food or beverage product lacks the organoleptic attributes desired, the product may not gain consumer acceptance.

It has been found that the supplementation of foods containing normal levels of organoleptically preferred fats and oils with nutritionally beneficial compositions that can deliver the creamy mouthfeel, richness impression and flavor impact desired by the consumer leads to greater overall consumer acceptance of nutritionally beneficial food and beverage products. It has also been found that heat-stable, denatured, insoluble protein particles can replicate the texture and other organoleptic properties of high-calorie fats and oils for use in products which provide the desired nutritional benefits.

Denaturation, in the context of protein chemistry, covers a wide range of changes in the molecular structure (i.e. conformation) of proteins. These conformational changes may be induced by heating a protein solution beyond the point which is characteristic for each protein and/or by exposing it to heat, acids, alkalis or various detergents. An irreversibly denatured protein has a reduced solubility relative to its undenatured or native state. In the broadest sense, the denaturation process involves the rupture of intermolecular hydrogen bonds such that the highly ordered structure of the native protein is replaced by a more random structure. While denaturation is usually irreversible, there are some instances, depending on the protein being treated and the treatment to which the protein is subjected, which are reversible.

As stated, protein denaturation can occur according to a variety of mechanisms at the molecular level. At some point towards the end of a denaturation process, though, changes occur which are directly perceivable by unaided human senses. In particular, these changes involve gelling, thickening and the development of opacity. This stage of the process is hereinafter referred to as "coagulation."

U.S. Pat. No. 5,882,705 discloses micellar whey proteins, which comprise casein micelle-like molecular aggregates formed by association and coagulation, and their use in food products. These micellar whey proteins exhibit the properties of being irregular in shape, soluble in water whereby they form a milky white solution, and associate, or "clump," when exposed to an acidic environment. The micellar whey proteins are obtained by hydrolyzing the whey protein in solution in the presence of heat and one or more proteolytic enzymes. The micellar whey proteins are then aggregated by exposure to an acidic environment.

U.S. Pat. No. 4,734,287 discloses fat substitute compositions of proteinaceous water-dispersible, macro-colloids of dairy whey protein. These compositions are produced by concentrating naturally occurring levels of undenatured whey protein, forming an aqueous dispersion of the undenatured whey protein containing 35%–55%, on a dry weight basis, of the undenatured whey protein, and then applying shear, in the presence of heat, in an acidic environment. The proteinaceous, water-dispersible, macro-colloids produced are denatured and partially soluble. Unfortunately, however, they are susceptible to further aggregation upon exposure to heat.

U.S. Pat. No. 5,393,550 discloses fat substitute compositions comprising porous particles consisting of carbohydrates, polysaccharides and proteins derived from seed grains. It is further disclosed that the fat substitute particles of these compositions can have sizes well in excess of 12 microns.

U.S. Pat. No. 5,330,778 discloses the preparation of undenatured microparticles of hydrophobic proteins that can be used as substitutes for fat. The microparticles are prepared from plant protein sources, such as prolamines, that are insoluble in water in their undenatured state, but soluble in aqueous alcohol.

Although conventional protein based fat and oil replacements have various known utilities, there are significant difficulties in using these proteins in food and beverage products that require long term shelf stability. Additionally, conventional protein-based fat and oil replacements are not suitable for use in all food and beverage products.

First, conventional protein based fat and oil replacements of the type described in the art are limited in their application. Conventional proteins, despite processing, are only partially denatured. These partially denatured proteins also have an unacceptably high degree of protein solubility. It has now been found that it is the partial denaturation and resulting partial solubility of the processed proteins that makes them susceptible to further agglomeration upon exposure to heat, thereby limiting their use to food and beverage products that are not subjected to high temperature sterilization procedures.

Food and beverage products that contain conventional protein based fat replacements have now been found to produce off flavors and an undesirable texture and appearance during exposure to high temperature sterilization procedures. This problem has now been found to be partially related to the presence of soluble, undenatured proteins being undesirably co-present with the desired insoluble protein particles. As these undenatured proteins undergo denaturation and insolubilization, they also coat themselves onto the inside surfaces of the sterilization equipment. This reduces the overall heat transfer efficiency of the process. Moreover, as the sterilization temperature is increased to maintain a consistent product temperature for the sterilized product, the newly denatured and insoluble proteins begin to undergo browning reactions, thereby contaminating the product being sterilized and producing the off-flavor and negative appearance and texture effects. Additionally, the exposure to temperatures required to effect product sterilization causes continued agglomeration of the proteins outside the organoleptically acceptable particle size range for beverages, which is from about 0.1 microns to about 5.0 microns, with less than about 2% of the particles exceeding about 5.0 microns. Protein agglomerations from about 0.1 microns to about 3.0 microns, with less than about 5% of the total number of particles exceeding about 3.0 microns, are more preferred.

Moreover, conventional protein based fat and oil replacement products of the type described have limited application in food and beverage products where visible sedimentation, from a product aesthetic standpoint, is unacceptable. Conventional insoluble proteins used as replacements for high-calorie fats and oils are susceptible to sedimentation caused by gravitational forces. Though the rate of sedimentation may be slowed, in part, by controlling particle size, it cannot be completely arrested. This creates a situation whereby the acceptable shelf-life of a food or beverage product from a product aesthetic standpoint may be significantly less than the acceptable shelf-life from a product taste or quality standpoint.

Finally, conventional protein based fat and oil replacement products of the type described are prepared in an acidic environment, usually at a pH below the isoelectric point of the protein selected. This requires that, prior to their use in non-acidic food and beverage products, the protein particles must be neutralized. If the protein particle is to be dried for later use, this is accomplished by the removal of water. However, if the protein particles were to be part of a continuous production process, additional steps would be required to neutralize the protein prior to introduction to the food or beverage product.

Accordingly, it is an object of the present invention to provide compositions which comprise denatured protein particles that are sufficiently free of soluble protein materials so as to withstand exposure to sterilization conditions, without undergoing substantial further denaturation, agglomeration, or browning reactions and which can be used in conventional sterilization equipment.

It is another object of the present invention to provide denatured, insoluble, heat-stable protein particles that exhibit a smooth, emulsion-like organoleptic character, especially when used in sterilized beverage compositions.

It is another object of the present invention to provide denatured, insoluble, heat-stable protein particles that will, resist, delay, or slow down gravitational sedimentation.

It is another object of the present invention to provide a process for creating denatured, insoluble, heat-stable protein particles from substantially undenatured, soluble, heat labile protein sources.

It is another object of the present invention to provide a process for creating denatured, insoluble, heat-stable protein particles from partially denatured, partially soluble, heat labile protein sources.

It is another object of the present invention to provide a process for creating denatured, insoluble, heat-stable protein particles from undenatured or partially denatured, soluble or partially soluble, heat labile protein sources in an environment that does not require neutralization of acidic protein particles prior to introduction into a food or beverage product.

It is another object of the present invention to provide food and beverage products containing denatured, insoluble, heat-stable protein particles derived from undenatured or partially denatured, soluble or partially soluble, heat labile protein sources, that exhibit the smooth, emulsion-like organoleptic character of similar products containing high-calorie fats and oils.

SUMMARY OF THE INVENTION

The present invention relates to insoluble, denatured, heat-stable protein particles for use in food and beverage products. The protein particles of the present invention are easily dispersible in aqueous suspensions and take the form of substantially non-aggregated, spheroidal particles. In a hydrated state (i.e. where the protein is substantially completely saturated with an aqueous solution) the mean diameter particle size distribution of the insoluble, denatured, heat-stable protein particles ranges from about 0.1 microns to about 5.0 microns, with less than about 2% of the particles exceeding about 5.0 microns in diameter. A mean diameter particle size distribution in the range from about 0.1 microns to about 3.0 microns, with less than about 5% of the total number of particles exceeding about 3.0 microns in diameter is more preferred. In aqueous suspensions the majority (i.e., from about 70% to about 100%) of the protein particles are substantially spheroidal in shape and, in aqueous suspensions, have a substantially smooth, emulsion-like organoleptic character similar to that of high-calorie fats and oils. Additionally, these protein particle containing aqueous suspensions have a degree of protein insolubility in excess of about 80%, preferably in excess of about 90%, more preferably in excess of about 95%.

The present invention also relates to a method of preparing insoluble, denatured, heat-stable protein particles from partially denatured, partially soluble protein sources and an improved method for preparing insoluble, denatured, heat-stable protein particles from substantially undenatured, soluble protein sources. Finally, the present invention relates to food and beverage products capable of being heat treated during or following production that contain the insoluble, denatured, heat-stable protein particles of the present invention.

DETAILED DESCRIPTION OF THE INVENTION

The present invention relates generally to the transformation of undenatured or partially denatured, partially soluble protein components to denatured, insoluble, heat-stable proteins suitable for use as supplements and replacements for high-calorie fats and oils.

A. Definition of Terms

In respect to the use of the term "hydrated state," the term is defined herein as being substantially completely saturated with an aqueous solution.

In respect to the use of the term "macro-colloid," the term is defined herein as any particle having some linear dimension from about 0.05 microns to about 10.0 microns.

In respect to the use of the term "denatured," the term is defined herein as a change in the three-dimensional conformation, or structure, of a protein from a more ordered state to a less ordered state. In respect to the use of the term "undenatured," the term is defined herein as having a conformation that is substantially unchanged from that of the protein in its native state.

In respect to the use of the term "heat-stable" protein particles, the term is defined herein as protein particles that do not cause substantial equipment fouling, do not substantially precipitate, do not substantially agglomerate, and do not undergo appreciable browning reactions when exposed to heat denaturing temperatures during food and beverage sterilization procedures.

In respect to the use of the term "substantially spheroidal in shape," the term is defined herein as encompassing the spectrum of spheroidal shapes, including spheres, and oblate or prolate spheroids. Compositions wherein spheres are the exclusive or predominant species are most preferred. However, the presence of other spheroidal shapes in compositions of the present invention are acceptable, but compositions wherein such other spheroidal shapes predominate or are the exclusive species are less preferred. The presence of rodiform and filamentous particles, while tolerable, is less preferred. Spicular particles are not preferred. Particles preferably have diameters (long axes in the case of non-spheres) of from about 0.1 to about 5.0 microns when measured in a hydrated state, preferably from about 0.1 microns to about 3.0 microns.

In respect to the use of the terms "mouth feel" and "organoleptic character" herein, it will be appreciated that such terms relate generally to a group of tactile impressions which, while common to the body as a whole, are particularly acutely perceived in the lingual, buccal and esophageal mucosal membranes. More precisely, the terms "mouth feel" and "organoleptic character" as used herein are in particular reference to those sensations associated with the tactile perception of fineness, coarseness, smoothness, and greasiness. Such tactile impressions are acutely appreciated in the oral cavity wherein subtle differences between various food and beverage textures are most readily perceived.

In respect to the use of the term "insoluble," the term is defined herein as the characteristic of being visible, either under optical magnification at 50×–100× (as distinguished from scanning electron microscopy) or to the unaided eye, when in an aqueous suspension. "Insoluble" particles can be precipitated or recovered upon centrifugation of an aqueous suspension. In respect to the use of the term "degree of protein insolubility," the term is defined herein as that portion of total protein particles in an aqueous suspension or solution that is "insoluble".

In respect to the use of the term "soluble," the term is defined herein as the characteristic of not being visible, either under optical magnification at 50×–100× (as distinguished from scanning electron microscopy) or to the unaided eye, when in an aqueous suspension or solution. Soluble materials are those which remain in solution after centrifugation sufficient to separate insoluble particles, typically from about 10,000 G to about 15,000 G. In respect to the use of the term "degree of protein solubility," the term is defined herein as that portion of the total protein particles that is "soluble" in an aqueous suspension or solution. The sum of the degree of protein insolubility and the degree of protein solubility should equal 100%.

In respect to the use of the term "suspension," the term is defined herein as an aqueous medium that comprises an "insoluble" particle component as that term is defined above. In respect to the use of the term "solution," the term is defined herein as an aqueous medium that is substantially free of "insoluble" particles as that term is defined above.

In respect to the use of the term "isoelectric point," the term is defined herein as the midpoint of the composite curve of the various isoelectric points of the individual protein components. It is recognized that with respect to proteins that the term "isoelectric point" does not necessarily refer to a single point, but can in fact refer to a range of points.

In respect to the use of the term "heat-treated beverage product," the term is defined herein as a beverage product that has undergone a type of sterilization treatment involving exposure to temperatures greater than or equal to the heat denaturation temperature of the protein or proteins incorporated into the product. It is recognized that the sterilization procedure is intended to prolong the product's shelf-life by minimizing or negating microbial activity. Sterilization treatments of the kind discussed herein include, but are not limited to, ultra high temperature (hereinafter UHT) (i.e., exposure to temperatures of from about 200° F. to about 400° F. for periods of from about 1 second to about 5 minutes) where substantially all pathogenic organisms, are destroyed, as well as pasteurization (i.e., exposure to temperatures of from about 100° F. to about 300° F., under pressure, for periods of from about 5 minutes to about 3 hours), and retorting (i.e., exposure to temperatures of from about 200° F. to about 300° F. for periods of from about 5 minutes to about 60 minutes), where substantially all viable organisms are destroyed.

In respect to the use of the term "instant beverage product," the term is defined herein as a dry, preferably powdered, drink mixture. Upon addition of water, or other suitable liquid, the instant beverage product is said to be "reconstituted." Depending on the type of beverage desired, it will be appreciated that heat may be applied after the instant beverage product has been reconstituted, or the liquid to be added may be heated prior to addition, thereby forming a beverage product ready for consumption. Beverage products designed to be served either hot or cold are encompassed by the present invention.

In respect to the use of the term "replaced," the term is defined herein as the removal of at least a portion of the naturally occurring levels of high-calorie fats and oils from a food or beverage product, and their substitution with the protein particles herein to achieve organoleptic characteristics similar to the original product. In respect to the use of the term "supplemented," the term is defined herein as the addition of particles or compositions, possessing organoleptic characteristics comparable to those of high-calorie fats and oils, to the naturally occurring levels of high-calorie fats and oils in a food or beverage product.

All percentages herein are by weight, unless otherwise specified. All cited references are, in relevant part, incorporated by reference.

B. Suitable Protein Sources

It has been determined according to the present invention that heat-stable, water dispersible protein particles, which in a hydrated state have a substantially smooth, emulsion-like, organoleptic character, may be produced from a variety of protein materials. The preferred protein for a particular use may vary according to considerations of availability, expense, and flavor associated with the protein. Additionally, the degree and nature of impurities and other components in the protein source may be considered. Preferred proteins of the present invention are those proteins that are substantially soluble in their undenatured state, and, which undergo denaturation and insolublization upon exposure to heat denaturing temperatures. Depending on the protein source selected, the rate of denaturation and the rate of insolublization may differ. Suitable protein sources include plant, dairy, and other animal protein sources. Representative of suitable proteins derived from suitable protein sources is the group consisting of: whey proteins, such as β-lactoglobulins and α-lactalbumins; bovine serum albumins; egg proteins, such as ovalbumins; and, soy proteins, such as glycinin and conglycinin. Combinations of suitable proteins are also acceptable for use in the present invention.

In one embodiment of the present invention the proteins are derived from a dairy protein source, in particular whey proteins. It is recognized that protein sources suitable for use in the present invention may contain various impurities and by-products. For example, whey protein concentrates can comprise as much as 40% lactose. The presence of such materials does not substantially affect the process herein. If desired, lactose-free products can be prepared by using conventional extraction procedures.

C. Protein Denaturation and Solubility

The denaturation of proteins is a process, or sequence of processes, by which the conformation of the protein in a native, undenatured state is changed to a more disordered arrangement. A change in the conformation of a protein is defined as any modification in the secondary, tertiary or quaternary conformation without the rupture of peptide bonds involved in the primary structure. Denaturation can be confined to a particular region of the protein, or may involve the entire molecule. Protein denaturation may be accompanied by the loss of one or more of the characteristic properties of the proteins being denatured, such as decreased solubility due to the exposure of hydrophobic groups, changes in water binding capacity, and increased susceptibility to attack by enzymes.

Heat is the most common physical agent capable of denaturing proteins. The rate of denaturation depends largely on the temperature. A temperature increase of 10° C. (50° F.), in the range of heat denaturing temperatures, increases the rate of denaturation by about 600 times. The functional characteristics of food proteins are influenced by heating temperature as well as heating rate and heating time. Alteration of these parameters affects both the macroscopic and microscopic structural attributes of the protein.

Protein solubility is controlled by a delicate balance between repulsive and attractive intermolecular forces. These forces are dependent upon protein and water structures and are affected by solvent conditions. Any condition that decreases the interactions between protein and water molecules decreases protein solubility (i.e. increases protein insolubility). For example, the exposure of hydrophilic groups to the interface between a protein molecule and water will decrease protein solubility. One of the major consequences of thermal denaturation is a reduction in protein solubility. However, the reduction in protein solubility is not directly proportional to the degree of protein denaturation. It is possible that exposure to heat denaturing temperatures is sufficient to change the conformational state of the protein, but insufficient to alter the intermolecular forces between the protein and water molecules to such an extent as to alter the protein's solubility. In such instances, the protein particle, although denatured, may still remain somewhat soluble.

D. Insoluble, Denatured Protein Formation

A conventional process for producing denatured whey protein particles of suitable size to emulate the organoleptic properties of high-calorie fats and oils comprises the steps of forming a whey protein concentrate comprising from about 35% to about 55% of a substantially undenatured whey protein in an aqueous solution. The solution is adjusted to a preferred pH range of from about 3.7 to about 4.2, preferably at least one unit below the isoelectric point of the whey protein using any food grade acid. The solution is heated to approximately 95° C. (203° F.). Shear is also applied using a suitable mixer at a rate of about 100,000 1/sec to about 750,000 1/sec for approximately 5 minutes.

This conventional process is sufficient to produce water-dispersible, macro-colloid whey protein particles comprising substantially non-aggregated, spheroidal particles of denatured dairy whey protein, having in a dry state a mean diameter particle size distribution ranging from about 0.1 microns to about 5.0 microns, with less than about 2 percent of the total number of particles exceeding 5.0 microns in diameter, preferably from about 0.1 microns to about 3.0 microns, with less than about 5 percent of the total number of particles exceeding 3.0 microns in diameter. However, the partially denatured whey protein compositions so formed have an average degree of protein solubility of approximately 40% (i.e., have an average degree of protein insolubility of approximately 60%). Such conventional protein compositions are available under the trade name Simplesse 100®, from the Nutrasweet Company of Chicago, Ill.

It has now been discovered that this level of protein solubility can cause the above-described problems associated with heat sterilizing products containing such protein compositions. The present invention provides a means for further reducing the level of protein solubility in such compositions, whereby the level of protein insolubility is raised to a range in excess of about 80%.

In one embodiment of the present invention a composition comprising undenatured, soluble protein particles, preferably whey protein, is denatured and insolublized in a process wherein the undenatured protein containing composition is concentrated in an aqueous solution that has a total solids content of about 20% by weight, with the undenatured protein particles being less than about 34% on a percent dry weight basis, preferably less than about 21% on a percent dry weight basis. The pH of the solution is adjusted to be in the upper half of the isoelectric curve for the protein being insolublized. A pH in the range of from about 5.5 to about 7.5 is preferred. A pH in the range of from about 6.1 to about 6.3 is especially preferred. The desired pH can be achieved through selection of an appropriate aqueous medium with an acceptable pH, water with a pH in the range of about 5.5. to about 7.5 is preferred. Alternatively, the pH of the solution can be adjusted using any food grade base. Carbonates, bicarbonates, and potassium phosphate are preferred. Sodium hydroxide and potassium hydroxide are especially preferred.

The solution is then heated to a temperature range of from about 75° C. (167° F.) to about 120° C. (248° F.), depending on the heat denaturing temperature of the protein selected and the desired degree of insolublization, over a period from about 5 minutes to about 120 minutes. During heating, mechanical energy is applied to the solution. The exact type of mechanical energy employed depends on the protein source selected, the desired particle size distribution range, the desired degree of protein insolubility, the equipment available, and other processing parameters. Suitable forms of mechanical energy for the present invention include high shear mixing (preferably applied at a rate of from about 100,000 1/sec to about 750,000 1/sec), homogenization (preferably operating in single stage at a pressure in excess of about 5000 psi (351.55 kg/cm$^2$), more preferably operating in a dual stage, at a pressure of less than about 6000 psi (421.86 kg/cm$^2$)), colloid milling (preferrably operating with an agap of about 1 micron to about 20 microns), and mixtures thereof. As the protein is denatured a suspension of the desired protein particles is formed. Combinations of high shear mixing and homogenization are especially preferred to ensure homogeneous mixtures in the resulting solutions.

Mechanical energy is preferably applied in the presence of heat. Mechanical energy can be applied in a single stage or in multiple stages. The exact length of time is dependent on the protein selected, the preferred degree of protein insolubility, and the desired particle size distribution range. Mechanical energy is preferably applied while the protein is being denatured and insolubilized. Preferably, the resulting particle size distribution range is from about 0.1 microns to about 5.0 microns, with less than about 2% of the particles exceeding about 5.0 microns. More preferably the particle size distribution range is from about 0.1 microns to about 3.0 microns, with less than about 5% of the particles exceeding about 3.0 microns. More preferably the particle size distribution range is from about 0.1 microns to about 2.0 microns, with less than about 2% of the particles exceeding about 3.0 microns. The exact particle size distribution range required will depend on the preferred organoleptic characteristics and the intended food or beverage product. Solid or semi-solid food products, such as cheese and yogurt, for example, have a higher tolerance for denatured, insoluble, heat-stable protein particles with sizes in excess of about 5.0 microns. This is because of the presence of other solid particles in the food products that have diameters in excess of about 5.0 microns. Lower viscosity beverage products, such as the ready-to-drink and instant beverage products of the present invention, require particle size distribution ranges with a mean diameter below about 5.0 microns because of sedimentation concerns, and the perceived negative organoleptic impact of particles in excess of about 5.0 microns (i.e., grittiness). These same beverage products preferably have particle size distribution ranges with a mean diameter in excess of about 0.1 microns, to avoid the perception of "wateriness".

Once the desired particle size distribution range and the desired degree of protein insolubility have been achieved, which is preferably greater than about 80%, more preferably greater than about 90%, more preferably greater than about 95%, the resulting suspension containing the further denatured, heat-stable protein particles with the desired degree of protein insolubility is cooled to below heat denaturing temperatures in a rapid fashion. It is preferred that the product is cooled to below heat denaturing temperatures in less than about 3 hours, more preferably in less than about 2 hours, more preferably in less than about 1 hour. This minimizes any agglomeration that may occur between protein particles following the removal of mechanical energy. Cooling to a preferred temperature of less than about 70° C. (158° F.) is achieved in less than about 1 hour, more preferably in less than about 30 minutes.

Once the suspension has been cooled it can be dried, preferably by spray drying, or stored in solution for use at a later time. Alternatively, the suspension can be utilized directly in the manufacture of food and beverage products.

In another embodiment of the present invention, a protein source comprising partially denatured, partially soluble protein particles, preferably whey protein, is further denatured and insolublized in a process wherein the partially denatured, partially soluble protein source is concentrated in suspension. The conditions of pH, mixing, etc. are as detailed above. The partially soluble protein particles, in solution, will be less than about 30% on a percent dry weight basis, preferably less than about 25% on a percent dry weight basis, more preferably about 21% on a percent dry weight basis. The insoluble protein particles, in suspension, will be in excess of about 25% on a percent dry weight basis, preferably in excess of about 30% on a percent dry weight basis, more preferably about 32% on a percent dry weight basis. Suitable partially denatured, partially soluble whey protein sources of the type preferred can be purchased commercially as Simplese 100®, manufactured by the NutraSweet Company® of Chicago, Ill.

In the forgoing process the target pH of the solution is selected so as to be in the upper half of the isoelectric curve for the protein or proteins being completely insolublized. The target pH can be achieved though selection of an aqueous medium with a suitable pH, or through the use of an acceptable food grade base. A pH in the range of from about 5.5 to about 7.5 is preferred. A pH in the range of from about 6.1 to about 6.3 is especially preferred. The solution is then heated to a temperature range of from about 75° C. (167° F.) to about 120° C. (248° F.), depending on the heat denaturing temperature of protein or proteins selected and the desired degree of protein insolublization. During heating, mechanical energy is applied to the solution. The exact form of mechanical energy selected depends on the protein source or sources selected, the desired particle size distribution range, the desired degree of protein insolubility, the equipment available, and other processing parameters. Suitable forms of mechanical energy for the present invention include high shear mixing (preferably applied at a rate of from about 100,000 1/sec to about 750,000 1/sec), homogenization (preferably operating in single stage at a pressure in excess of about 5000 psi (351.55 kg/cm$^2$), more preferably operating in a dual stage, at a pressure of less than about 6000 psi (421.86 kg/cm$^2$)), colloid milling, and mixtures thereof. A combination of high shear mixing and homogenization is especially preferred to ensure a homogeneous mixture in solution.

Mechanical energy is preferably applied in the presence of heat, and preferably for in excess of about 15 minutes. The exact length of time is dependent on the protein or proteins selected, the preferred degree of protein insolubility, the desired particle size distribution range, and the desired concentration of protein particles. Such matters are well known in the mixing arts and operative ranges can be established by routine experimentation. Preferably, the particle size distribution range is from about 0.1 microns to about 5.0 microns, with less than about 2% of the particles exceeding about 5.0 microns. More preferably the particle size distribution range is from about 0.1 microns to about 3.0 microns, with less than about 5% of the particles exceeding about 3.0 microns. More preferably the particle size distribution range is from about 0.1 microns to about 2.0 microns, with less than about 2% of the particles exceeding about 3.0 microns. The exact particle size distribution range required will depend on the preferred organoleptic characteristics and the intended food or beverage product. Mechanical energy can be applied in a single stage or in multiple stages.

Once the desired particle size distribution range and the desired degree of protein insolubility (preferably greater than about 80%, more preferably greater than about 90%, more preferably greater than about 95%, more preferably greater than about 98%) have been achieved, the suspension containing the further denatured, heat-stable protein particles with the desired degree of protein insolubility is cooled. The denatured, insoluble, heat-stable protein containing suspension is preferably cooled to below heat denaturing temperatures in a rapid fashion. This diminishes the possibility of any agglomeration occurring between protein particles, following the removal of mechanical energy. Cooling to a preferred temperature of less than about 70° C. (158° F.) is achieved within about 6 hours, preferably in less than about 3 hours, more preferably in less than about 1 hour. Once the suspension has been cooled it can be dried, preferably by spray drying, or stored as a suspension for use at a later time. Alternatively, the suspension could be utilized directly in the manufacture of food and beverage products.

E. Suspension Promotion Agents

Conventional, insoluble proteins of the type used as replacements for high-calorie fats and oils are susceptible to sedimentation caused by gravitational forces. The rate of sedimentation of insoluble particles in food and beverage products can be measured as a function of the drag forces on the particle, resulting from the viscosity of the liquid suspension medium; the density of the insoluble particle; and, the intermolecular repulsion of the particles in suspension. Careful control of these parameters can slow, or even arrest the rate of sedimentation. Suspension promotion agents which are capable of influencing such factors as drag forces and intermolecular repulsion are, therefore, preferably included in the food and beverage products of the present invention, such as ready-to-drink and instant beverage products.

1. Repulsion Inducing Suspension Promotion Agents

Suspension promotion agents which promote the repulsion of particles from each other help to disperse and suspend the insoluble, denatured, heat-stable protein particles of the present invention within the aqueous medium used to prepare the food or beverage products.

Not intended to be limited by theory, it is believed that the repulsion inducing suspension promotion agents bond with the external hydrophobic (sulfhydryl) groups of the insoluble, denatured, heat-stable protein particles. This hydrophobic bonding imparts a net positive charge on the denatured, insoluble protein particles, thereby repelling other positively charged, denatured, insoluble protein particles. This repulsion effect results in a gravimetrically stable suspension of insoluble, denatured protein particles.

Examples of such suitable, ingestible repulsion inducing suspension promotion agents include mono and diglycerides of long chain fatty acids, preferably saturated fatty acids, more preferably, stearic and palmitic acid mono- and diglycerides. Other suitable repulsion inducing suspension promotion agents include lecithin, polyglycerol esters, sorbitan esters, sucrose esters, polyethoxylated glycerols, lactylated mono- and diglycerides, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, and mixtures thereof. Sucrose monoesters are a preferred repulsion inducing suspension promotion agent for use in the food and beverage products of the present invention; sucrose palmitate is especially preferred. Propylene glycol esters are also useful in these edible mixes.

Ready-to-drink beverage products of the present invention preferably contain, on a weight-by-weight percent basis, from about 0.1% to about 1% of a repulsion inducing suspension promotion agent. Alternatively, and equally preferred, the concentration of repulsion inducing suspension promotion agents can be measured as a ratio of repulsion inducing suspension promotion agents to protein particles. Preferably the ready-to-drink beverages of the present invention have a repulsion inducing suspension promotion agent to protein particle ratio of from about 0.03:1 to about 0.25:1.

2. Viscosity Influencing Suspension Promotion Agents

Suspension promotion agents that influence viscosity help to counteract the drag forces experienced by the insoluble, denatured, heat-stable protein particles of the present invention, while still maintaining the fluid characteristics of the aqueous medium used to prepare the food or beverage products. The viscosity influencing suspension promotion agent increases the viscosity of a food or beverage product when the product is at rest (i.e., in the absence of shear force), and decreases the viscosity of the food or beverage product upon the application of small levels of shear ("shear thinning"), as would be experienced by shaking, stirring, or pouring.

The viscosity influencing suspension promotion agents employed in the present invention are composed of carbohydrate polymers. While not intended to be limited by theory, it is believed that the viscosity increase, in a resting state (i.e., in the absence of shear force), exhibited by products containing the viscosity influencing suspension promotion agents is a result of a the formation of a loose matrix. The carbohydrate polymers in the viscosity influencing suspension promotion agents may exhibit ion-induced association, thereby forming the loose matrix. The loose matrix structure, so formed, is capable of suspending the protein particles of the present invention over several months or longer.

However, upon the application of small amounts of shear, as would occur during shaking, stirring, or pouring of the product, the carbohydrate polymers within the loose matrix begin to separate, and reorient themselves with respect to each other. This causes the matrix to open up and results in a decrease in viscosity for the food or beverage product. The greater the amount of shear applied (i.e., shaking the product with increased vigor) the greater the decrease in viscosity will be experienced. Depending on the amount of shear applied the viscosity of the food or beverage product containing the viscosity influencing suspension promotion agent can ultimately approach the viscosity of similar food or beverage products not containing such suspension promotion agents.

Examples of such suitable viscosity influencing suspension promotion agents are xanthan gum, guar gum, carageenan, gellan gum, and mixtures thereof. Gellan gum is particularly preferred for use in the ready-to-drink and instant beverage formulations of the present invention.

Ready-to-drink beverage products of the present invention preferably contain, on a weight-by-weight percent basis, from about 0.001% to about 0.5% of a viscosity influencing suspension promotion agent.

Because of the proximity in time of beverage preparation and consumption, the art is generally less concerned with the problem of gravitational sedimentation in instant beverage products which are prepared and consumed by the consumer. However, in applications where sedimentation is of concern, the instant beverage products of the present invention may contain either repulsion inducing suspension promotion agents, viscosity influencing suspension promotion agents, or mixtures thereof. The concentration of these suspension promotion agents on a dry weight basis, or as a ratio described above, can be easily calculated from the final formulation of the beverage in the consumable state.

EXAMPLES

The following examples further describe and demonstrate embodiments within the scope of the present invention. These examples are given solely for the purpose of illustration and are not to be construed as a limitation of the present invention, as many variations thereof are possible without departing from the invention's spirit and scope. The analytical methods used to measure solubility and particle size are known in the art and are set forth hereinafter for the convenience of the reader.

I. Method for Measuring Particle Size

The particle size distribution of the macro-colloid protein particles of the present invention is measured using a HORIBA LA-910 laser scattering particle size distribution analyzer Two types of distributions are measured that characterize particle size distribution, mean and median. A Volume Distribution is used to follow structural changes, and the effect of a small number of large particles. The Volume Distribution is usually represented as a bimodal (sometimes trimodal) curve. A Number Distribution is used to measure the number of particles of a given median particle size. Typically, the Number Distribution results in a single peak which is properly characterized by its median. With respect to organoleptic properties, such as mouthfeel, there is no significant difference between median and mean particle size for particles below about 5 microns in diameter. It is preferred, however, to use a mean particle size measurement to represent the average particle size in solution or suspension. Particle size distributions are measured by preparing 1 ml to 2 ml samples and following the procedures recommended by the equipment manufacturer.

II. Method for Measuring Protein Solubility

The solubility of the protein particles of the present invention is measured by reacting the protein solution with the Coomassie Brilliant Blue G-250 dye. The dye binds to the protein and forms a complex that produces a change in color. A dispersion of the protein particles is centrifuged until substantially all the solids precipitate out of solution and form a solids pellet. A 0.05 ml sample of the supernate is mixed with 1.5 ml of the Coomassie Brilliant Blue G-250. The absorbance of the mixture is read at 595 nm in a Milton Roy Company Spectronic 601 spectrophotometer. Protein concentration is read from a calibration curve (protein concentration in mg/ml vs. absorbance) developed using the pure protein and the technique described in the instrument manufacturer's literature.

Example 1

A three liter mixture of approximately 20% by weight of a protein source partially comprising insoluble particles and partially comprising whey protein (Simplesse® 100) and approximately 80% by weight of of about 70° F. (21.11° C.) water is prepared in a 4000 ml beaker. The mixture is heated to a temperature of about 170° F. (76.66° C.) under constant high shear mixing using an IKA ULTRA-TURRAX T-50 High Shear Mixer operating at 5200 rpm. The mixture is kept at about 170° F. (76.66° C.) for approximately 30 minutes and then cooled to a temperature of at least about 90° F. (32.22° C.) under the continued application of high shear mixing. The mixture is then homogenized using a APV Gaulin Homogenizer operating in a single stage, at a pressure of about 7000 psi (492.17 kg/cm$^2$). The homogenization step is repeated three times. The resulting protein particles have a degree of protein insolubility of about 80%, and have a mean diameter particle size distribution range of from about 0.1 microns to about 3.0 microns, with less than about 5% of the total number of particles exceeding about 3.0 microns in diameter.

Example 2

A fifteen gallon initial mixture of Example 1 is prepared by mixing the whey protein and water in a WARING Heavy Duty Lab Blender and transferring the mixture to a 25 gallon tank equipped with an agitator. The mixture is pumped into a tubular heat exchanger and a NIRO-SOAVI Type NS2006H Homogenizer and re-circulated back to the tank. The mixture is heated to about 170° F. (76.66° C.) and homogenized in a dual stage homogenizer, at a pressure of about 500/5500 psi (31.16/386.71 kg/cm$^2$). Homogenization is performed for approximately 30 minutes after which the mixture is cooled to a temperature of about 90° F. (32.22° C.) over a period of about 30 minutes, while maintaining circulation through the heat exchanger and homogenizer. The resulting protein particles have a degree of protein insolubility of about 80%, and have a mean diameter particle size distribution range of from about 0.1 microns to about 3.0 microns, with less than about 5% of the total number of particles exceeding about 3.0 microns in diameter.

Example 3

A forty five gallon initial mixture of Example 1 is prepared by mixing the whey protein and water in a 50 gallon BREDO Likwifier equipped with a high shear blade and transferring the mixture to a 100 gallon tank equipped with an agitator. The mixture is pumped into a tubular heat exchanger and a NIRO-SOAVI Type NS2006H Homogenizer and re-circulated back to the tank. The mixture is heated to about 210° F. (98.88° C.) and homogenized in a dual stage homogenizer at a pressure of about 500/5500 psi (35.16/386.71 kg/cm$^2$). Homogenization is performed for approximately 150 minutes, after which the mixture is cooled to about 90° F. (32.22° C.) over a period of about 30 minutes, while maintaining the circulation through the heat exchanger and homogenizer. The resulting protein particles have a degree of protein insolubility of about 90%, and have a mean diameter particle size distribution range of from about 0.1 microns to about 3.0 microns, with less than about 5% of the total number of particles exceeding about 3.0 microns in diameter.

Example 4

A 10 gallon batch of a ready-to-drink coffee flavored beverage, using the protein particles of the present invention, is prepared according to the following procedure:

Two percent of sucrose esters of fatty acids (P1670, RYOTO) are added to the final macro-colloid dispersion of Example 2. The mixture is subjected to homogenization in an APV Gaulin Homogenizer, operating in a single stage, at a pressure 6000 psi (421.86 kg/cm$^2$). The resulting whey protein dispersion is mixed with the ingredients of the coffee flavored beverage of Table 1.

TABLE 1

| Ingredient | % |
|---|---|
| Water | 28.26 |
| Milk | 50.0 |
| Whey protein/Sucrose Ester Dispersion of Example 4 | 15.0 |
| Coffee extract (9.0% solids) | 2.5 |
| Sweetener (Fructose, Sucrose, Maltodextrin, K) | 3.5 |
| Green Tea Powder | 0.15 |
| Gums (Xanthan gum, Guar gum, and Carage | 0.03 |
| Flavors | 0.5 |
| Caffeine | 0.014 |
| Vitamin/mineral Premix | 0.046 |

The ingredients are mixed in a 10 gallon tank and subjected to UHT treatment, in a UHT/HTST Microthermics Lab Unit equipped with an NIRO-SOAVI Type NS2006H Homogenizer operating in a double stage at 500/2500 psi (35.16/175.78 kg/cm$^2$), at 287° F. (141.66° C.) for 6 sec. The coffee flavored beverage is then packed under sterile conditions in a Microthermics Clean Fill Hood equipped with a High Efficiency Purified Air (HEPA) air filter. After 45 days, the coffee flavored ready-to-drink beverage shows no signs of sedimentation upon visual inspection.

Example 5

A 10 gallon batch of a ready-to-drink coffee flavored beverage using the macro-colloid protein particles of the present invention is prepared according to the following procedure:

Two percent of sucrose esters of fatty acids (P1670, RYOTO) are added to the final macro-colloid dispersion of Example 2, and subjected to homogenization in an APV Gaulin Homogenizer, operating in a single stage at a pressure of about 6000 psi (421.86 kg/cm$^2$). The resulting whey protein is mixed with the ingredients of the coffee flavored beverage of Table 1 from Example 4.

The protein dispersion containing the sucrose esters and the ingredients from Table 1 are mixed in a 20 gallon tank. This composition is placed in 12 oz glass bottles that are sealed in a steam injection equipped sealer to generate vacuum upon sealing and steam condensation at the water-air interface. The sealed glass bottles are placed in a Retort with continuous agitation, and processed for approximately 5 min at about 250° F. (121.11° C.).

Example 6

A three liter aqueous, protein/carbohydrate mixture is prepared. The aqueous mixture is approximately 20% by weight of a protein/carbohydrate mixture prepared according to Table 2, and approximately 80% by weight of about 70° F. (21.11° C.) water. A 4000 ml sample is prepared in a beaker.

TABLE 2

| Ingredient | % (d.b.) |
|---|---|
| Soluble, Undenatured Protein | 60 |
| Sucrose | 30 |
| Maltodextrin (M 100) | 10 |

The sample is heated to a temperature of about 190° F. (87.77° C.), under constant high shear mixing using an IKA ULTRA-TURRAX T-50 High Shear Mixer operating at about 5200 rpm. The sample is maintained at about 190° F. (87.77° C.) for approximately 30 minutes and then cooled to a temperature of about 90° F. (32.22° C.) over a period of approximately 30 minutes, under the continued application of high shear mixing. The sample is homogenized using a APV Gaulin Homogenizer, operating in a single stage at 7000 psi (492.17 kg/cm$^2$). The homogenization step is repeated three times. The resulting heat-stable, denatured, protein particles of the present example have a degree of protein insolubility of about 90%, and have a mean diameter particle size distribution range of from about 0.1 microns to about 3.0 microns, with less than about 5% of the total number of particles exceeding about 3.0 microns in diameter.

Example 7

A 10 gallon batch of a ready-to-drink coffee flavored beverage, using the heat stable protein particles of the present invention, is prepared according to the following procedure:

The ingredients of Table 3 are mixed in a 10 gallon tank and subjected to UHT treatment, in a UHT/HTST Microthermics Lab Unit equipped with an NIRO-SOAVI Type NS2006H Homogenizer operating in a double stage at 500/2500 psi (35.16/386.71 kg/cm$^2$), at 287° F. (141.67° C.) for 6 sec.

TABLE 3

| Ingredient | % |
|---|---|
| Water | 33.26 |
| Milk | 50.0 |
| Whey protein dispersion (from Example 3) | 10.0 |
| Coffee extract (9.0% solids) | 2.5 |
| Sweetener | 3.5 |
| Green Tea | 0.15 |
| Gellan Gum | 0.03 |
| Flavors | 0.5 |
| Caffeine | 0.014 |
| Vitamin/mineral Premix | 0.046 |

The resulting coffee flavored beverage is then packed under sterile conditions in a Microthermics Clean Fill Hood equipped with a High Efficiency Purified Air (HEPA) air filter. After 45 days, the coffee flavored ready-to-drink beverage shows no signs of sedimentation upon visual inspection.

Example 8

A 10 gallon batch of a ready-to-drink coffee flavored beverage, using the heat stable protein particles of the present invention, is prepared according to the following procedure:

The ingredients of Table 4 are mixed in a 10 gallon tank and subjected to UHT treatment, in a UHT/HTST Microthermics Lab Unit equipped with an NIRO-SOAVI Type NS2006H Homogenizer operating in a double stage at 500/2500 psi (35.16/175.78 kg/cm$^2$), at 287° F. (141.67° C.) for 6 sec.

TABLE 4

| Ingredient | % |
| --- | --- |
| Water | 23.24 |
| Milk | 60.0 |
| Whey protein dispersion (from Example 3) | 10.0 |
| Coffee extract (9.0% solids) | 2.5 |
| Sweetener | 3.5 |
| Green Tea | 0.15 |
| Gellan Gum | 0.05 |
| Flavors | 0.5 |
| Caffeine | 0.014 |
| Vitamin/mineral Premix | 0.046 |

The resulting coffee flavored beverage is then packed under sterile conditions in a Microthermics Clean Fill Hood equipped with a High Efficiency Purified Air (HEPA) air filter. After 45 days, the coffee flavored ready-to-drink beverage shows no signs of sedimentation upon visual inspection.

Example 9

A 10 gallon batch of a ready-to-drink coffee flavored beverage, using the heat stable protein particles of the present invention, is prepared according to the following procedure:

The ingredients of Table 5 are mixed in a 10 gallon tank and subjected to UHT treatment, in a UHT/HTST Microthermics Lab Unit equipped with an NIRO-SOAVI Type NS2006H Homogenizer operating in a double stage at 500/2500 psi (35.16/175.78 kg/cm$^2$), at 287° F. (141.67° C.) for 6 sec.

TABLE 5

| Ingredient | % |
| --- | --- |
| Water | 30.75 |
| Milk | 50.0 |
| Whey protein dispersion (from Example 3) | 10.0 |
| Coffee extract (9.0% solids) | 2.5 |
| Sweetener | 6.0 |
| Green Tea | 0.15 |
| Gellan Gum | 0.03 |
| Carrageenan gum | 0.01 |
| Flavors | 0.5 |
| Caffeine | 0.014 |
| Vitamin/mineral Premix | 0.046 |

The resulting coffee flavored beverage is then packed under sterile conditions in a Microthermics Clean Fill Hood equipped with a High Efficiency Purified Air (HEPA) air filter. After 45 days, the coffee flavored ready-to-drink beverage shows no signs of sedimentation upon visual inspection.

Example 10

A 10 gallon batch of a ready-to-drink coffee flavored beverage, using the heat stable protein particles of the present invention, is prepared according to the following procedure:

The ingredients of Table 6 are mixed in a 10 gallon tank and subjected to UHT treatment, in a UHT/HTST Microthermics Lab Unit equipped with an NIRO-SOAVI Type NS2006H Homogenizer operating in a double stage at 500/2500 psi (35.16/175.78 kg/cm$^2$), at 287° F. (141.67° C.) for 6 sec.

TABLE 6

| Ingredient | % |
| --- | --- |
| Water | 33.26 |
| Milk | 50.0 |
| Whey protein/Sucrose Ester Dispersion from Ex | 10.0 |
| Coffee extract (9.0% solids) | 2.5 |
| Sweetener | 3.5 |
| Green Tea | 0.15 |
| Gellan Gum | 0.03 |
| Flavors | 0.5 |
| Caffeine | 0.014 |
| Vitamin/mineral Premix | 0.046 |

The resulting coffee flavored beverage is then packed under sterile conditions in a Microthermics Clean Fill Hood equipped with a High Efficiency Purified Air (HEPA) air filter. After six months, the coffee flavored ready-to-drink beverage shows no sign of sedimentation.

Example 11

A 10 gallon batch of a ready-to-drink tea flavored beverage using the protein particles of the present invention was prepared according to the following procedure:

TABLE 7

| Ingredient | % (d.b.) |
| --- | --- |
| Water | 28.91 |
| Milk | 50.0 |
| Whey protein from Example 2 | 15.0 |
| Instant Tea | 2.0 |
| Sweetener | 3.5 |
| Gellan Gum | 0.03 |
| Flavors | 0.5 |
| Caffeine | 0.014 |
| Vitamin/mineral Premix | 0.046 |

The ingredients of Table 7 are mixed in a 20 gallon tank and subjected to UHT treatment at 287° F. for 10 sec. in a UHT/HTST Microthermics Lab Unit, equipped with an NIRO-SOAVI Type NS2006H Homogenizer operated in a double stage at 500/2500 psi. After the heat treatment the tea flavored beverage was packed under sterile conditions in a Microthermics Clean Fill Hood equipped with a High Efficiency Purified Air (HEPA) air filter. After 45 days, the coffee flavored ready-to-drink beverage shows no signs of sedimentation upon visual inspection.

Example 12

A 10 gallon batch of a ready-to-drink juice flavored beverage using the protein particles of the present invention was prepared according to the following procedure:

TABLE 8

| Ingredient | % (d.b.) |
| --- | --- |
| Water | 40.76 |
| Orange juice | 40.0 |
| Whey protein from Example 2 | 15.0 |
| Sweetener | 3.5 |
| Green Tea | 0.15 |
| Gellan Gum | 0.03 |
| Flavors | 0.5 |
| Caffeine | 0.014 |
| Vitamin/mineral Premix | 0.046 |

The ingredients of Table 8 are mixed in a 20 gallon tank and subjected to UHT treatment at 287° F. for 10 sec. in a UHT/HTST Microthermics Lab Unit, equipped with an NIRO-SOAVI Type NS2006H Homogenizer operated in a double stage at 500/2500 psi. After the heat treatment the juice flavored beverage was packed under sterile conditions in a Microthermics Clean Fill Hood equipped with a High Efficiency Purified Air (HEPA) air filter. After 45 days, the coffee flavored ready-to-drink beverage shows no signs of sedimentation upon visual inspection.

Having now described several embodiments of the present invention it should be clear to those skilled in the art that the forgoing is illustrative only and not limiting, having been presented only by way of exemplification. Numerous other embodiments and modifications are contemplated as falling within the scope of the present invention as defined by the appended claims thereto.

What is claimed is:

1. A composition of matter comprising substantially non-aggregated denatured protein particles having in a hydrated state a mean diameter particle size distribution ranging from about 0.1 microns to about 3.0 microns, with less than about 5 percent of the total number of particles exceeding about 3.0 microns in diameter, and wherein the majority of the said particles are substantially spheroidal in shape, said particles in a hydrated state having a substantially smooth, fatty, emulsion-like organoleptic character, said particles having a degree of protein insolubility of at least about 80%, said composition comprising no more than about 20%, by weight, of soluble protein materials.

2. The particles of claim 1 wherein said denatured protein is selected from the group consisting of dairy proteins, animal proteins, plant proteins, and mixtures thereof.

3. The particles of claim 2 wherein said degree of protein insolubility is at least about 90%, said composition comprising no more than about 10%, by weight, of soluble protein materials.

4. The particles of claim 3 wherein said denatured protein is dairy whey protein.

5. A composition of matter in the form of an aqueous dispersion comprising substantially denatured protein particles having in the hydrated state a mean diameter particle size distribution ranging from about 0.1 microns to about 3.0 microns, with less than about 5 percent of the total number of particles exceeding about 3.0 microns in diameter, and wherein the majority of said particles are substantially spheroidal in shape, said particles in said aqueous dispersion having a substantially smooth, fatty, emulsion-like organoleptic character, said particles having a degree of protein insolubility of at least about 80%, said composition comprising no more than about 20%, by weight, of soluble protein materials.

6. The aqueous dispersion of claim 5 wherein said denatured protein is selected from the group consisting of dairy proteins, animal proteins, plant proteins, and mixtures thereof, and wherein said degree of protein insolubility is at least about 90%, said composition comprising no more than about 10%, by weight, of soluble protein materials.

7. The aqueous dispersion of claim 6 wherein said denatured protein is dairy whey protein.

8. A composition of matter according to claim 5 wherein said protein particles are produced from an aqueous medium wherein:
  (a) the pH of said aqueous medium is in the range of from about 5.5 to about 7.5;
  (b) the total protein content of the aqueous medium is from about 40% to about 60% on a dry weight basis and comprises;
    (i) an insoluble denatured protein component at levels greater than about 50% of total protein;
    (ii) a soluble denatured protein component at levels less than about 50% of total protein; and,
    (iii) optionally, an undenatured protein component at levels less than about 50% of total protein.

9. The aqueous dispersion of claim 8 wherein the protein is selected from the group consisting of dairy protein, plant protein, animal protein, and mixtures thereof.

10. A process for preparing heat-stable, insoluble, denatured protein particles comprising the steps of heating undenatured protein particles at heat denaturing temperatures, in an aqueous medium, at a pH within the upper half of the isoelectric curve of said undenatured protein articles, under the application of mechanical energy, said mechanical energy selected so as to promote the formation of proteinaceous particles having a mean diameter from about 0.1 microns to about 3.0 microns, with less than about 5 percent of the total number of particles exceeding about 3.0 microns in diameter in a hydrated state and said particles having a degree of protein insolubility of at least about 80%, said composition comprising no more than about 20%, by weight, of soluble protein materials.

11. The process of claim 10 wherein said undenatured protein particles are selected from the group consisting of dairy protein, plant protein, animal protein, and mixtures thereof.

12. The process of claim 10 wherein said mechanical energy is selected from the group consisting of high shear mixing, homogenization, and mixtures thereof.

13. A process for insolublizing protein comprising the steps of heating partially denatured, partially soluble protein particles at heat denaturing temperatures, in an aqueous solution, at a pH within the upper half of the isoelectric curve of said protein, under the application of mechanical energy, said mechanical energy selected so as to promote the formation of proteinaceous particles having in a hydrated state a mean diameter from about 0.1 microns to about 3.0 microns, with less than about 5 percent of the total number of particles exceeding about 3.0 microns in diameter and said particles having a degree of protein insolubility of at least about 80%, said composition comprising no more than about 20%, by weight, of soluble protein materials.

14. The process of claim 13 wherein said partially denatured, partially soluble protein particles are selected from the group consisting of dairy protein, plant protein, animal protein, and mixtures thereof.

15. The process of claim 13 wherein said mechanical energy is selected from the group consisting of high shear mixing, homogenization, and mixtures thereof.

16. A process for insolublizing protein comprising the steps of heating partially denatured, partially soluble protein particles in an aqueous solution, at a temperature in excess of about 60° C. (140° F.) and at a pH from about 5.5 to about 7.5, under the application of mechanical energy, said mechanical energy being selected so as to promote the formation of proteinaceous particles having in a hydrated state a mean diameter from about 0.1 microns to about 3.0 microns, with less than about 5 percent of the total number of particles exceeding about 3.0 microns in diameter and said particles having a degree of protein insolubility of at least about 80%, said composition comprising no more than about 20%, by weight, of soluble protein materials.

17. The process of claim 16 wherein said partially denatured, partially soluble protein particles are selected from the group consisting of dairy protein, plant protein, animal protein, and mixtures thereof.

18. The process of claim 16 wherein said mechanical energy is selected from the group consisting of high shear mixing, homogenization, and mixtures thereof.

19. The process for insolublizing protein of claim 16 wherein said pH is from about 6.2 to about 6.4.

20. A process for insolublizing protein comprising the steps of heating partially denatured, partially soluble protein particles in an aqueous solution, at a temperature in excess of about 60° C. and at a pH from about 5.5 to about 7.5, under the application of high shear mixing within the range from about 450,000 reciprocal minutes to about 600,000 reciprocal minutes for at least about 15 minutes to form particles having a degree of protein insolubility of at least about 80%, said composition comprising no more than about 20%, by weight, of soluble protein materials.

21. The process of claim 20 wherein said partially denatured, partially soluble protein particles are selected from the group consisting of dairy protein, plant protein, animal protein, and mixtures thereof.

22. A heat-treated beverage product comprising:
   (a) a heat-stable, insoluble, denatured, proteinaceous particle component, having in a hydrated state a mean diameter particle size distribution ranging from about 0.1 microns to about 3.0 microns, with less than about 5% of the total number of said particles exceeding about 3.0 microns in diameter, wherein said proteinaceous particle component has a degree of protein solubility less than about 20%;
   (b) an aqueous carrier; and,
   (c) optional flavor components.

23. The beverage product of claim 22 having a naturally occurring level of high calorie fat, wherein said naturally occurring level of high calorie fat has been supplemented with said proteinaceous particle component.

24. The beverage product of claim 23 wherein said proteinaceous particle component is selected from the group consisting of dairy protein, plant protein, animal protein, and mixtures thereof.

25. The beverage product of claim 22 wherein said heat-treated beverage product is a ready-to-drink coffee flavored beverage.

26. The beverage product of claim 25 wherein said proteinaceous particle component is selected from the group consisting of dairy protein, plant protein, animal protein, and mixtures thereof.

27. The beverage product of claim 22 wherein said proteinaceous particle component is selected from the group consisting of dairy protein, plant protein, animal protein, and mixtures thereof.

28. The beverage product of claim 22 wherein said beverage product further comprisies a suspension promotion agent.

29. The beverage product of claim 28 wherein said suspension promotion agent is selected from the group consisting of repulsion inducing suspension promotion agents, viscosity influencing suspension promotion agents, and mixtures thereof.

30. The beverage product of claim 29 wherein said suspension promotion agent is selected from the group consisting of C6–C18 fatty acid esters of sucrose, gellan gum, and mixtures thereof.

31. An instant beverage product comprising:
   (a) a heat-stable, insoluble, denatured, proteinaceous particle component having in a hydrated state a mean diameter particle size distribution ranging from about 0.1 microns to about 3.0 microns, with less than about 5% of the total number of said particles exceeding 3.0 microns in diameter, wherein said proteinaceous particle component has a degree of protein solubility less than about 20%; and,
   (b) optional flavor components.

32. The beverage product of claim 31 wherein said instant beverage product is a coffee flavored beverage.

33. The beverage product of claim 32 wherein said proteinaceous particle component is selected from the group consisting of dairy protein, plant protein, animal protein, and mixtures thereof.

34. The beverage product of claim 31 wherein said proteinaceous particle component is selected from the group consisting of dairy protein, plant protein, animal protein, and mixtures thereof.

35. The beverage product of claim 31 having a naturally occurring level of high calorie fat and/or oil, wherein said naturally occurring level of high calorie fat and/or oil has been supplemented with said proteinaceous particle component.

36. The beverage product of claim 31 wherein said proteinaceous particle component is comprised of dairy whey protein.

37. The beverage product of claim 31 wherein said beverage product further comprises a suspension promotion agent.

38. The beverage product of claim 37 wherein said suspension promotion agent is selected from the group consisting of repulsion inducing suspension promotion agents, viscosity influencing suspension promotion agents, and mixtures thereof.

39. The beverage product of claim 38 wherein said suspension promotion agent is selected from the group consisting of C6–C18 fatty acid esters of sucrose, gellan gum, and mixtures thereof.

40. A composition of matter comprising substantially non-aggregated denatured protein particles having in a hydrated state a mean diameter particle size distribution ranging from about 0.1 microns to about 5.0 microns, with less than about 2 percent of the total number of particles exceeding about 5.0 microns in diameter, and wherein the majority of the said particles are substantially spheroidal in shape, said particles in a hydrated state having a substantially smooth, fatty, emulsion-like organoleptic character, said particles having a degree of protein insolubility of at least about 80%, said composition comprising no more than about 20%, by weight, of soluble protein materials.

* * * * *